(12) United States Patent
Lorgouilloux et al.

(10) Patent No.: US 8,124,038 B2
(45) Date of Patent: Feb. 28, 2012

(54) IM-16 CRYSTALLISED SOLID AND PROCESS FOR THE PREPARATION THEREOF

(75) Inventors: Yannick Lorgouilloux, Limoges (FR); Jean-Louis Paillaud, Mulhouse (FR); Philippe Caullet, Illzach (FR); Joel Patarin, Flaxlanden (FR); Nicolas Bats, Feyzin (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 73 days.

(21) Appl. No.: 12/669,651

(22) PCT Filed: Jun. 24, 2008

(86) PCT No.: PCT/FR2008/000891
§ 371 (c)(1),
(2), (4) Date: Jul. 6, 2010

(87) PCT Pub. No.: WO2009/024665
PCT Pub. Date: Feb. 26, 2009

(65) Prior Publication Data
US 2010/0286402 A1    Nov. 11, 2010

(30) Foreign Application Priority Data

Jul. 20, 2007 (FR) ..................... 07 05315

(51) Int. Cl.
*B01J 29/06* (2006.01)
*C01B 39/46* (2006.01)
*C01B 39/02* (2006.01)

(52) U.S. Cl. ............ 423/305; 423/306; 423/DIG. 30; 502/208; 502/214

(58) Field of Classification Search .......... 423/305, 423/306, DIG. 30; 502/208, 214
See application file for complete search history.

(56) References Cited

U.S. PATENT DOCUMENTS

| | | | |
|---|---|---|---|
| 6,998,101 B2 * | 2/2006 | Josien et al. | .......... 423/305 |
| 2004/0209759 A1 | 10/2004 | Harbuzaru et al. | |
| 2004/0220045 A1 | 11/2004 | Mathieu et al. | |
| 2005/0067604 A1 | 3/2005 | Harbuzaru et al. | |

FOREIGN PATENT DOCUMENTS

| | | |
|---|---|---|
| EP | 1440936 A1 | 7/2004 |
| EP | 1454882 A1 | 9/2004 |
| EP | 1518827 A1 | 3/2005 |
| WO | 2007135266 A1 | 11/2007 |
| WO | WO 2007135266 A1 * | 11/2007 |
| WO | PCT/FR08/00891 R | 12/2008 |

* cited by examiner

*Primary Examiner* — Yong Chu
(74) *Attorney, Agent, or Firm* — Millen, White, Zelano & Branigan, P.C.

(57) ABSTRACT

The invention relates to a crystallized solid, denoted by the name IM-16, which has an X-ray diffraction pattern as provided hereinafter. Said solid has a chemical composition expressed in accordance with the empirical formula $mXO_2:nGeO_2:pZ_2O_3:qR:sF:wH_2O$, where R represents one or more organic species, X represents one or more tetravalent elements different from germanium, Z represents at least one trivalent element and F is fluorine.

8 Claims, 1 Drawing Sheet

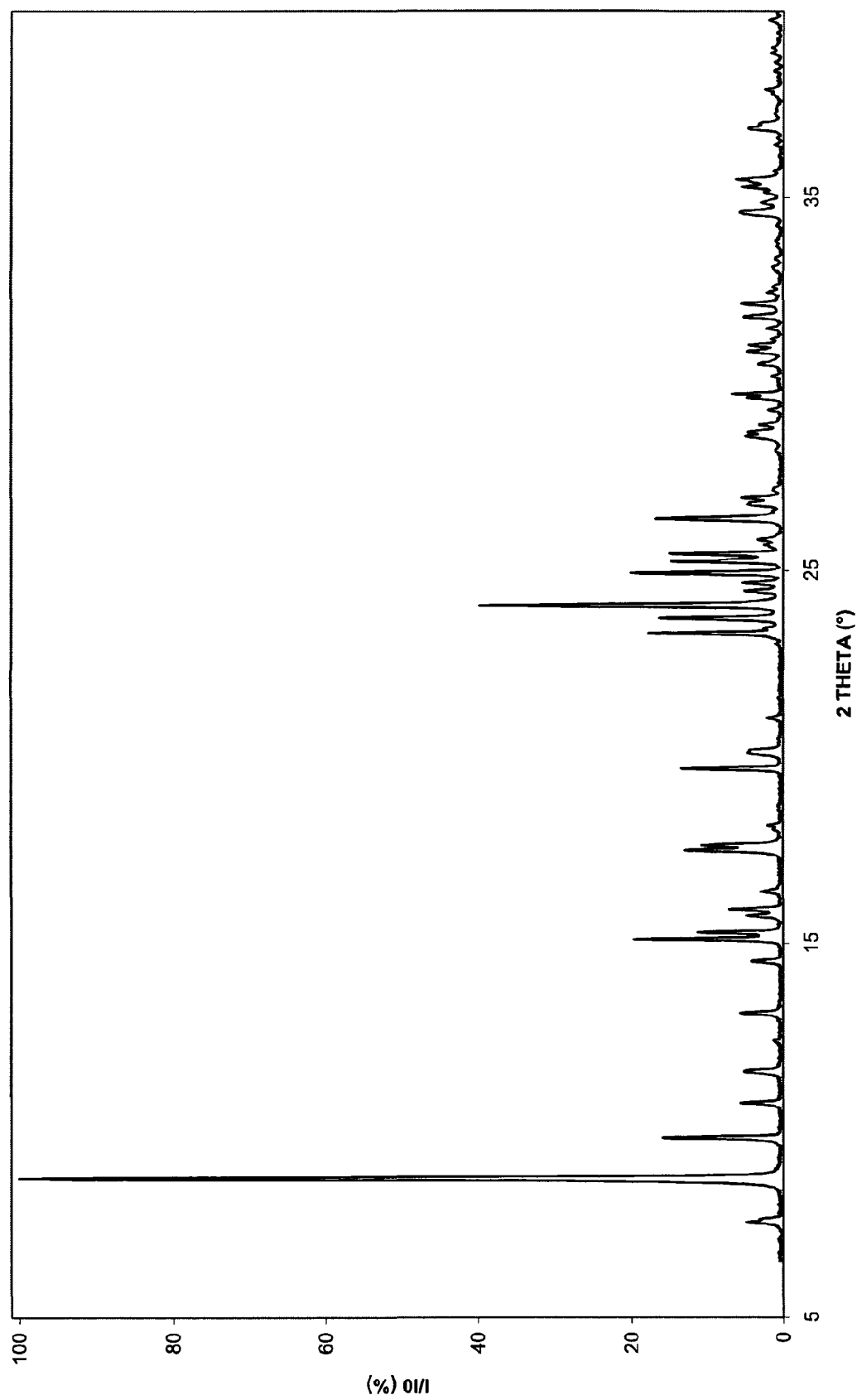

IM-16 CRYSTALLISED SOLID AND PROCESS FOR THE PREPARATION THEREOF

TECHNICAL FIELD

The present invention relates to a new crystallised solid, referred to hereinafter as IM-16, having a new crystal structure and also to a process for preparing said solid.

PRIOR ART

During recent years, the search for new microporous molecular sieves has led to the synthesis of a large variety of products of this class. A large variety of aluminosilicates with a zeolitic structure that are characterised in particular by their chemical composition, the diameter of the pores that they contain, the shape and the geometry of their microporous system has thus been developed.

Among the zeolites synthesised for about forty years, a certain number of solids have allowed real progress to be made in the fields of adsorption and catalysis. Examples of these include the Y zeolite (U.S. Pat. No. 3,130,007) and the ZSM-5 zeolite (U.S. Pat. No. 3,702,886). The number of new molecular sieves, covering zeolites, synthesised each year is constantly rising. For a more complete description of the various molecular sieves that have been discovered, reference may usefully be made to the following work: "Atlas of Zeolites Framework Types," Ch. Baerlocher, W. M. Meier and D. H. Olson, Fifth Revised Edition, 2001, Elsevier. Examples include the NU-87 zeolite (U.S. Pat. No. 5,178,748), the MCM-22 zeolite (U.S. Pat. No. 4,954,325) or else the gallophosphate (cloverite) of CLO structural type (U.S. Pat. No. 5,420,279) or else the zeolites ITQ-12 (U.S. Pat. No. 6,471,939), ITQ-13 (U.S. Pat. No. 6,471,941), CIT-5 (U.S. Pat. No. 6,043,179), ITQ-21 (WO-02/092511), ITQ-22 (Corma, A. et al., Nature Materials 2003, 2, 493), SSZ-53 (Burton, A., et al., Chemistry: a Eur. Journal, 2003, 9, 5737), SSZ-59 (Burton, A., et al., Chemistry: a Eur. Journal, 2003, 1, 5737), SSZ-58 (Burton, A., et al., J. Am. Chem. Soc., 2003, 125, 1633) and UZM-5 (Blackwell, C. S. et al., Angew. Chem., Int. Ed., 2003, 42, 1737).

Several of the zeolites cited hereinbefore have been synthesised in a fluoride medium in which the mobilising agent is not the usual hydroxide ion but the fluoride ion according to a process that was initially described by Flanigen et al. (U.S. Pat. No. 4,073,865), then developed by J.-L. Guth et al. (Proc. Int. Zeol. Conf., Tokyo, 1986, p. 121). The pH values of the synthesis media are typically close to neutrality. One of the advantages of these fluorinated reaction systems is to allow purely silicic zeolites that contain fewer defects than the zeolites that are obtained in the traditional OH⁻ medium to be obtained (J. M. Chezeau et al., Zeolites, 1991, 11, 598). Another decisive advantage that is linked to the use of fluorinated reaction media is to make it possible to obtain new silicic framework topologies that contain double cycles with four tetrahedrons (D4R), as in the case of the ITQ-7, ITQ-12 and ITQ-13 zeolites. Moreover, the joint use of germanium and silicon sources in the synthesis media may also make it possible to obtain new frameworks of this type, i.e. containing D4R units, both in a conventional non-fluorinated basic medium and in a fluorinated medium, as in the case of the ITQ-17 and ITQ-21 (A. Corm et al., Chem. Commun., 2001, 16, 1486, Chem. Commun., 2003, 9, 1050) or IM-12 (J. L. Paillaud et al., Science, 2004, 304, 990) zeolites.

DESCRIPTION OF THE INVENTION

The present invention relates to a new crystallised solid, called an IM-16 crystallised solid, having a new crystal structure. Said solid has a chemical composition expressed by the following general formula: $mXO_2:nGeO_2:pZ_2O_3:qR:sF:wH_2O$, wherein R represents one or more organic species, X represents one or more tetravalent elements different from germanium, Z represents at least one trivalent element and F is fluorine, m, n, p, q, s and w representing respectively the number of moles of $XO_2$, $GeO_2$, $Z_2O_3$, R, F and $H_2O$ and m is between 0.2 and 1, n is between 0 and 0.8, p is between 0 and 0.1, q is between 0 and 0.2, s is between 0 and 0.2 and w is between 0 and 0.2.

The IM-16 crystallised solid according to the invention has an X-ray diffraction pattern including at least the lines entered in Table 1. This new IM-16 crystallised solid has a new crystal structure.

This diffraction pattern is obtained by radiocrystallographic analysis by means of a diffractometer by using the conventional powder method with $K\alpha_1$ radiation of copper ($\lambda=1.5406$ Å). Starting from the position of the diffraction peaks represented by the angle $2\theta$, the characteristic $d_{hkl}$ recticular equidistances of the sample are calculated by Bragg's equation. The measuring error $\Delta(d_{hkl})$ to $d_{hkl}$ is calculated, based on the absolute error $\Delta(2\theta)$ that is assigned to the measurement of $2\theta$, by Bragg's equation. An absolute error $\Delta(2\theta)$ that is equal to $\pm0.02°$ is commonly allowed. The relative intensity $I/I_0$ that is assigned to each value of $d_{hkl}$ is measured according to the height of the corresponding diffraction peak. The X-ray diffraction pattern of the IM-16 crystallised solid according to the invention comprises at least the lines to the values of $d_{hkl}$ provided in Table 1. In the $d_{hkl}$ column, the mean values of the inter-reticular distances are indicated in Angstroms (Å). Each of these values should be provided with the measuring error $\Delta(d_{hkl})$ between $\pm0.2$ Å and $\pm0.003$ Å. The DRX pattern having allowed Table 1 to be drawn up was produced from an IM-16 crystallised solid in its crude synthesis form.

TABLE 1

Mean values of $d_{hkl}$ and relative intensities measured on an X-ray diffraction pattern of the IM-16 crystallised solid

| 2 theta (°) | $d_{hkl}$ (Å) | I/I0 | 2 theta (°) | $d_{hkl}$ (Å) | I/I₀ |
|---|---|---|---|---|---|
| 7.55 | 11.70 | ff | 24.45 | 3.64 | ff |
| 8.73 | 10.12 | FF | 24.68 | 3.60 | ff |
| 9.81 | 9.01 | f | 24.94 | 3.57 | f |
| 10.74 | 8.23 | ff | 25.25 | 3.52 | f |
| 11.59 | 7.63 | ff | 25.46 | 3.50 | ff |
| 13.15 | 6.73 | ff | 26.39 | 3.37 | f |
| 14.53 | 6.09 | ff | 26.96 | 3.31 | ff |
| 15.13 | 5.85 | f | 28.61 | 3.12 | ff |
| 15.30 | 5.79 | ff | 29.74 | 3.00 | ff |
| 15.75 | 5.62 | ff | 30.88 | 2.89 | ff |
| 15.92 | 5.56 | ff | 31.05 | 2.88 | ff |
| 17.51 | 5.06 | ff | 31.81 | 2.81 | ff |
| 17.64 | 5.02 | ff | 32.16 | 2.78 | ff |
| 19.70 | 4.50 | ff | 34.61 | 2.59 | ff |
| 20.12 | 4.41 | ff | 35.29 | 2.54 | ff |
| 23.32 | 3.81 | f | 35.49 | 2.53 | ff |
| 23.73 | 3.75 | f | 36.86 | 2.44 | ff |
| 24.08 | 3.69 | mf | | | | where FF = very high; m = medium; f = low; F = high; mf = medium low; ff = very low. Relative intensity $I/I_0$ is provided in relation to a relative intensity scale where a value of 100 is attributed to the most intense line of the X-ray diffraction pattern: ff < 15; 15 ≦ f < 30; 30 ≦ mf < 50; 50 ≦ m < 65; 65 ≦ F < 85; FF ≧ 85.

The X-ray diffraction pattern of the IM-16 crystallised solid according to the invention does not comprise a line having a high (F) and medium (m) relative intensity I/I0.

BRIEF DESCRIPTION OF THE DRAWINGS

The IM-16 crystallised solid according to the invention has a new crystal structure with a base or topology that is characterised by its X-ray diffraction pattern provided by FIG. 1. FIG. 1 has been drawn up from an IM-16 crystallised solid in its crude synthesis form.

Said IM-16 solid has a chemical composition defined by the following general formula: $mXO_2:nGeO_2:pZ_2O_3:qR:sF:wH_2O$(I), where R represents one or more organic species, X represents one or more tetravalent elements different from germanium, Z represents at least one trivalent element and F is fluorine. In Formula (I), m, n, p, q, s and w represent respectively the number of moles of $XO_2$, $GeO_2$, $Z_2O_3$, R, F and $H_2O$ and m is between 0.2 and 1, n is between 0 and 0.8, p is between 0 and 0.1, q is between 0 and 0.2, s is between 0 and 0.2 and w is between 0 and 0.2.

Advantageously, the X/Ge ratio of the framework of the IM-16 crystallised solid according to the invention is between 0.25 and ∞, preferably between 0.5 and 1.5 and very preferably between 0.7 and 1. The value of n is preferably between 0.05 and 0.8. The ratio {(n+m)/p} is greater than or equal to 10 and is preferably greater than or equal to 20. The value of p is between 0 and 0.1, very preferably between 0 and 0.05 and even more preferably between 0.01 and 0.02. The value of q is between 0 and 0.2, advantageously between 0.02 and 0.2 and very advantageously between 0.05 and 0.15. According to the invention, s is between 0 and 0.2, preferably s is between 0.01 and 0.2 and very preferably s is between 0.02 and 0.1. The value assumed by w is, according to the invention, between 0 and 0.2, preferably between 0 and 0.1.

In accordance with the invention, X is preferably selected from silicon, tin and titanium, very preferably X is silicon, Z is preferably selected from aluminium, boron, iron, indium and gallium and very preferably Z is aluminium. Preferably, X is silicon: the IM-16 crystallised solid according to the invention is then, when germanium oxide and the element Z are present, a crystallised metallogermanosilicate having an X-ray diffraction pattern identical to that described in Table 1, in particular when it is in its crude synthesis form. Even more preferably, X is silicon and Z is aluminium: the IM-16 crystallised solid according to the invention is then a crystallised aluminogermanosilicate having an X-ray diffraction pattern identical to that described in Table 1, in particular when it is in its crude synthesis form.

In the case in which the IM-16 crystallised solid according to the invention is in its crude synthesis form, i.e. obtained directly from the synthesis and prior to any step of calcinations(s) and/or ion exchange(s) that is well known to the person skilled in the art, said IM-16 solid comprises at least one organic species such as that described hereinafter or its decomposition products, or else its precursors. In its crude synthesis form, the one or more organic species R present in the general formulae defining the IM-16 solid is (are) at least in part, and preferably entirely, said one or more organic species. According to a preferred embodiment of the invention, R is the cation 1-ethyl-3-methylimidazolium. Said organic species R, which acts as a structuring agent, can be removed by the conventional methods of the prior art such as heat treatments and/or chemical treatments. The IM-16 crystallised solid according to the invention is preferably a zeolitic solid.

The invention also relates to a process for preparing the IM-16 crystallised solid involving reacting an aqueous mixture comprising at least one source of at least one $XO_2$ oxide, optionally at least one source of at least one $Z_2O_3$ oxide, optionally at least one source of at least one germanium oxide, at least one organic species R and at least one source of fluoride ions, the mixture preferably having the following molar composition:

$(XO_2+GeO_2)/Z_2O_3$: at least 5, preferably at least 10,
$H_2O/(XO_2+GeO_2)$: 1 to 50, preferably 2 to 30,
$R/(XO_2+GeO_2)$: 0.1 to 3, preferably 0.25 to 1,
$XO_2/GeO_2$: 0.5 to ∞, preferably 1 to 10 and very preferably from 1.5 to 4,
$F/(XO_2+GeO_2)$: 0.1 to 2, preferably 0.2 to 1, where X is one or more tetravalent elements different from germanium, preferably silicon, Z is one or more trivalent elements selected from the group formed by the following elements: aluminium, iron, boron, indium and gallium, preferably aluminium. Preferably, said aqueous mixture comprises at least one source of a germanium oxide.

In accordance with the process according to the invention, R is an organic species acting as an organic structuring agent. Preferably, R is the nitrogen-containing compound 1-ethyl-3-methylimidazolium.

The source of the X element can be any compound that comprises the X element and can release this element in an aqueous solution in reactive form. Advantageously, when the X element is silicon, the silica source can be any of those currently used in the synthesis of zeolites, for example solid silica in powder form, silicic acid, colloidal silica or dissolved silica or tetraethoxysilane (TEOS). Among the powdered silicas, it is possible to use precipitated silicas, in particular those obtained by precipitation starting from an alkaline metal silicate solution, such as aerosol silicas, pyrogenic silicas, for example "CAB-O-SIL", and silica gels. It is possible to use colloidal silicas that have various particle sizes, for example with a mean equivalent diameter of between 10 and 15 nm or between 40 and 50 nm such as those sold under the filed trade mark "LUDOX".

The germanium source can be any compound that comprises the element germanium and can release this element in an aqueous solution in reactive form. The germanium source can be a crystallised germanium oxide in what are known as quartz or rutile forms. It is also possible to use germanium sources such as tetraethoxygermanium or tetraisopropoxygermanium. The germanium source is preferably an amorphous germanium oxide $GeO_2$.

The source of the Z element can be any compound that comprises the Z element and that can release this element in an aqueous solution in reactive form. In the preferred case where Z is aluminium, the alumina source is preferably sodium aluminate, or an aluminium salt, for example chloride, nitrate, hydroxide or sulphate, an alkoxide of aluminium or of alumina itself, preferably in hydrated or hydratable form, such as for example colloidal alumina, pseudoboehmite, gamma-alumina or alpha or beta-trihydrate. It is also possible to use mixtures of the sources cited hereinbefore.

Fluorine can be introduced in the form of salts of alkali metals or ammonium, such as for example NaF, $NH_4F$, $NH_4HF_2$, or in the form of hydrofluoric acid or else in the form of hydrolysable compounds that can release fluoride anions into water such as silicon fluoride $SiF_4$ or fluorosilicates of ammonium $(NH_4)_2SiF_6$ or sodium $Na_2SiF_6$.

A preferred embodiment of the process according to the invention involves reacting an aqueous mixture comprising silica, optionally alumina, a germanium oxide, 1-ethyl-3-methylimidazolium hydroxide and a source of fluoride ions.

The process according to the invention consists in preparing an aqueous reaction mixture that is called a gel and contains at least one source of at least one $XO_2$ oxide, optionally at least one source of at least one $GeO_2$ oxide, optionally at least one source of at least one $Z_2O_3$ oxide, at least one source of fluoride ions and at least one organic species R. Preferably, said aqueous reaction mixture contains at least one source of at least one $GeO_2$ oxide. The amounts of said reagents are adjusted so as to impart to this gel a composition that allows its crystallisation into IM-16 crystallised solid of general formula $mXO_2:nGeO_2:pZ_2O_3:qR:sF:wH_2O$, where m, n, p, q, s and w meet the criteria defined hereinbefore. Then, the gel is subjected to a hydrothermal treatment until the IM-16 crystallised solid is formed. The gel is advantageously put under hydrothermal conditions under an autogenous reaction pressure, optionally by adding gas, for example nitrogen, at a temperature of between 120° C. and 200° C., preferably between 140° C. and 180° C., and even more preferably at a temperature that does not exceed 175° C. until the formation of IM-16 solid crystals according to the invention. The time that is necessary for obtaining the crystallisation generally varies between 1 hour and several months depending on the composition of the reagents in the gel, the stifling and the reaction temperature. The reaction is generally carried out while stifling or without stifling.

It may be advantageous to add seeds to the reaction mixture so as to reduce the time that is necessary for the formation of the crystals and/or the total crystallisation period. It may also be advantageous to use seeds so as to promote the formation of the IM-16 crystallised solid to the detriment of impurities. Such seeds comprise crystallised solids, in particular IM-16 solid crystals. The seed crystals are generally added in a proportion of between 0.01 and 10% of the mass of the $(XO_2+GeO_2)$ oxides, $XO_2$ being preferably silica, used in the reaction mixture.

At the end of the reaction, the solid phase is filtered and washed; it is then ready for subsequent steps such as drying, dehydration and calcination and/or ion exchange. For these steps, all of the conventional methods that are known to the person skilled in the art can be used.

The present invention also relates to the use of said IM-16 solid as an adsorbent. Preferably, said IM-16 solid is freed of the organic species, preferably of the cation 1-ethyl-3-methylimidazolium, when it is used as an adsorbent. When it is used as an adsorbent, the IM-16 crystallised solid according to the invention is generally dispersed in an inorganic matrix phase containing channels and cavities allowing the fluid to be separated to access the crystallised solid. These matrices are preferably inorganic oxides, for example silicas, aluminas, silica-aluminas or clays. The matrix generally accounts for between 2 and 25% by mass of the adsorbent thus formed.

The invention is illustrated by means of the following examples.

EXAMPLE 1

Preparation of an IM-16 Solid According to the Invention

A 1-ethyl-3-methylimidazolium hydroxide solution is firstly prepared as follows: 20 g of an aqueous solution containing 50% by mass of 1-ethyl-3-methylimidazolium bromide (Solvionic), i.e. 52.33 mmol, are poured into a 500 ml polypropylene vial (Nalgen). 52.33 g of Dowex SBR LX NG resin, OH form (Supelco), then 100 ml of distilled water are added to this solution. The mixture is stirred for 16 hours with the aid of a magnetic stirrer. The solution is separated from the resin by filtration. The anion exchange performance is then checked by comparing the results of a conventional acid-base analysis with the aid of a hydrochloric acid solution with those of an NMR $^1H$ analysis in the presence of dioxane as an internal reference. As the cation 1-ethyl-3-methylimidazolium concentration of the solution is only 0.36 $mol \cdot L^{-1}$, the solution is then concentrated with the aid of a benchtop freeze drier (Cryo Rivoire) until the volume of the solution is approximately 20 ml. The concentration of the solution is then re-analysed with the aid of the techniques described hereinbefore. The use of NMR also makes it possible to check that the cation 1-ethyl-3-methylimidazolium has not deteriorated. The final 1-ethyl-3-methylimidazolium hydroxide concentration of the solution is 2.41 $mol \cdot L^{-1}$.

9.597 ml of an aqueous solution containing 2.41 mol/l of 1-ethyl-3-methylimidazolium hydroxide (2.967 g of R—OH) are poured into a Teflon vessel having an internal volume of 20 ml. 1.937 g of germanium oxide (Aldrich) are then added to this solution. The mixture is stirred for 15 minutes with the aid of a magnetic stirrer. 6.193 ml (5.782 g) of TEOS (tetraethoxysilane, Fluka) are then introduced. The mixture is then stirred for 48 hours at ambient temperature in order to evaporate the ethanol formed by the hydrolysis of the TEOS and to remove the excess water. 1.024 ml (1.157 g) of aqueous HF solution (40% by mass hydrofluoric acid, Carlo Erba) are then added. The mixture is then stirred for 15 minutes. After weighing and adjustment of the required water content, the molar composition of the mixture obtained is: 0.6 $SiO_2$:0.4 $GeO_2$:0.5 1-ethyl-3-methylimidazolium:0.5 HF:8 $H_2O$. The Teflon shell containing the synthesis mixture (pH ~7.5) is then introduced into an autoclave which is placed into an oven at 170° C. for a period of 14 days without stirring.

After filtration, the product which is obtained is washed several times with distilled water. It is then dried at 70° C. for 24 hours. The dry product mass obtained is approximately 0.81 g.

The dried solid product was analysed by X-ray diffraction and identified as consisting of IM-16 solid.

EXAMPLE 2

Preparation of an IM-16 Solid According to the Invention 9.597 ml of an aqueous solution containing 2.41 mol/l of 1-ethyl-3-methylimidazolium hydroxide (2.967 g of R—OH), prepared in accordance with the method described in Example 1, are poured into a Teflon vessel having an internal volume of 20 ml. 0.969 g of germanium oxide (Aldrich) are then added to this solution. The mixture is stirred for 15 minutes with the aid of a magnetic stirrer. 8.253 ml (7.709 g) of TEOS (tetraethoxysilane, Fluka) are then introduced. The mixture is then stirred for 48 hours at ambient temperature in order to evaporate the ethanol formed by the hydrolysis of the TEOS and to remove the excess water. 1.024 ml (1.157 g) of aqueous HF solution (40% by mass hydrofluoric acid, Carlo Erba) are then added. The mixture is then stirred for 15 minutes. After weighing and adjustment of the required water content, the molar composition of the mixture obtained is: 0.8 $SiO_2$:0.2 $GeO_2$:0.5 1-ethyl-3-methylimidazolium:0.5 HF:8 $H_2O$.

The Teflon shell containing the synthesis mixture (pH ~8) is then introduced into an autoclave which is placed into an oven at 170° C. for a period of 14 days without stirring. After filtration, the product which is obtained is washed several times with distilled water. It is then dried at 70° C. for 24 hours. The dry product mass obtained is approximately 0.88 g.

The dried solid product was analysed by X-ray diffraction and identified as consisting of IM-16 solid.

EXAMPLE 3

Preparation of an IM-16 Solid According to the Invention 14.395 ml of an aqueous solution containing 2.41 mol/l of 1-ethyl-3-methylimidazolium hydroxide (4.447 g of R—OH), prepared in accordance with the method described in Example 1, are poured into a Teflon vessel having an internal volume of 20 ml. 0.0109 g of aluminium hydroxide (63 to 67% by mass of $Al_2O_3$, Fluka) and 1.453 g of germanium oxide (Aldrich) are then added to this solution. The mixture is stirred for 1 hour with the aid of a magnetic stirrer. Approximately 0.055 g of the synthesis product obtained in Example 1, which was previously ground (i.e. 2% of the mass of the oxides $SiO_2$, $GeO_2$ and $Al_2O_3$), are then introduced as seeds; the mixture is then stirred for 15 minutes. 4.643 ml (4.337 g) of TEOS (tetraethoxysilane, Fluka) are then introduced. The mixture is then stirred for 48 hours at ambient temperature in order to evaporate the ethanol formed by the hydrolysis of the TEOS and to remove the excess water. 0.768 ml (0.868 g) of aqueous HF solution (40% by mass hydrofluoric acid, Carlo Erba) are then added; the mixture is then stirred for 15 minutes. After weighing and adjustment of the required water content, the molar composition of the mixture obtained is: 0.6 $SiO_2$:0.4 $GeO_2$:0.02 $Al_2O_3$:1 1-ethyl-3-methylimidazolium:0.5 HF:8 $H_2O$ (+2% by mass of seeds in relation to $SiO_2$, $GeO_2$ and $Al_2O_3$).

The Teflon shell containing the synthesis mixture (pH ~9) is then introduced into an autoclave which is placed into an oven at 170° C. for a period of 14 days without stirring. After filtration, the product which is obtained is washed several times with distilled water. It is then dried at 70° C. for 24 hours. The dry product mass obtained is approximately 1.21 g.

The dried solid product was analysed by X-ray diffraction and identified as consisting of IM-16 solid.

EXAMPLE 4

Preparation of an Adsorbent Containing the IM-16 Crystallised Solid

The solid used is the crude synthesis solid from Example 2 and comprising the organic species 1-ethyl-3-methylimidazolium. This solid is subjected firstly to a heating while being flushed with nitrogen at a temperature of 200° C. for 4 hours, then a calcination, still under nitrogen atmosphere, at 550° C. for 8 hours. At the end of these first treatments, the solid obtained is calcined at 550° C. for 8 hours under an air flow then for a further 8 hours under a stream of oxygen.

The solid which is obtained is then brought into the form of extrudates by kneading with boehmite (Pural SB3, Sasol) in a kneader having a Z-shaped arm and extrusion of the paste obtained using a ram extruder. The extrudates are then dried at 120° C. for 12 h in air and calcined at 550° C. for 2 hours under an air flow in a muffle furnace.

The adsorbent thus prepared is made up of 80% IM-16 zeolitic solid and 20% alumina.

The invention claimed is:

1. IM-16 crystallized solid having an X-ray diffraction pattern including at least the lines entered in the table below:

| 2 theta (°) | dhkl (Å) | I/I0 |
|---|---|---|
| 7.55 | 11.70 | ff |
| 8.73 | 10.12 | FF |
| 9.81 | 9.01 | f |
| 10.74 | 8.23 | ff |
| 11.59 | 7.63 | ff |
| 13.15 | 6.73 | ff |
| 14.53 | 6.09 | ff |
| 15.13 | 5.85 | f |
| 15.30 | 5.79 | ff |
| 15.75 | 5.62 | ff |
| 15.92 | 5.56 | ff |
| 17.51 | 5.06 | ff |
| 17.64 | 5.02 | ff |
| 19.70 | 4.50 | ff |
| 20.12 | 4.41 | ff |
| 23.32 | 3.81 | f |
| 23.73 | 3.75 | f |
| 24.08 | 3.69 | mf |
| 24.45 | 3.64 | ff |
| 24.68 | 3.60 | ff |
| 24.94 | 3.57 | f |
| 25.25 | 3.52 | f |
| 25.46 | 3.50 | ff |
| 26.39 | 3.37 | f |
| 26.96 | 3.31 | ff |
| 28.61 | 3.12 | ff |
| 29.74 | 3.00 | ff |
| 30.88 | 2.89 | ff |
| 31.05 | 2.88 | ff |
| 31.81 | 2.81 | ff |
| 32.16 | 2.78 | ff |
| 34.61 | 2.59 | ff |
| 35.29 | 2.54 | ff |
| 35.49 | 2.53 | ff |
| 36.86 | 2.44 | ff | where FF = very high; m = medium; f = low; F = high; mf = medium low; ff = very low and having a chemical composition expressed by the following general formula: $mXO_2:nGeO_2:pZ_2O_3:qR:sF:wH_2O$, wherein R represents one or more organic species, X represents one or more tetravalent elements different from germanium, Z represents at least one trivalent element and F is fluorine, m, n, p, q, s and w representing respectively the number of moles of $XO_2$, $GeO_2$, $Z_2O_3$, R, F and $H_2O$ and m is between 0.2 and 1, n is between 0 and 0.8, p is between 0 and 0.1, q is between 0 and 0.2, s is between 0 and 0.2 and w is between 0 and 0.2.

2. IM-16 crystallized solid according to claim 1, wherein X is silicon.

3. IM-16 crystallized solid according to claim 1, wherein Z is aluminium.

4. IM-16 crystallized solid according to claim 1, wherein the {(n+m)/p} is greater than or equal to 10, n is between 0.05 and 0.8, p is between 0 and 0.1, q is between 0 and 0.2, s is between 0 and 0.2 and w is between 0 and 0.2.

5. Process for preparing an IM-16 crystallized solid according to claim 1, consisting in initiating the mixing, in an aqueous medium, of at least one source of at least one $XO_2$ oxide, optionally at least one source of at least one $Z_2O_3$ oxide, optionally at least one source of at least one $GeO_2$ oxide, at least one source of fluoride ions and at least one organic species R consisting of the cation 1-ethyl-3-methylimidazolium, then in initiating the hydrothermal treatment of said mixture until said IM-16 crystallised solid is formed.

6. Process for preparing an IM-16 crystallized solid according to claim 5, such that the molar composition of the reaction mixture is such that:

$(XO_2+GeO_2)/Z_2O_3$: at least 5, $H_2O/(XO_2+GeO_2)$: 1 to 50, $R/(XO_2+GeO_2)$: 0.1 to 3, $XO_2/GeO_2$: 0.5 to $\infty$, $F/(XO_2+GeO_2)$: 0.1 to 2.

7. Preparation process according to claim 5, such that seeds are added to the reaction mixture.

8. An adsorbent method comprising contacting a fluid with the IM-16 crystallized solid according to claim 1.

* * * * *